Patented Feb. 27, 1940

2,192,143

UNITED STATES PATENT OFFICE 2,192,143

FLUORINATION PROCESS

Thomas Midgley, Jr., Worthington, and Albert L. Henne, Columbus, Ohio, assignors, by mesne assignments, to Kinetic Chemicals, Inc., Wilmington, Del., a corporation of Delaware No Drawing. Application May 7, 1938,
Serial No. 206,530

9 Claims. (Cl. 260—653)

This invention relates to the fluorination of organic compounds by the replacement of a halogen other than fluorine with fluorine. More particularly it relates to the treatment of compounds containing at least one acyclic carbon atom having attached thereto at least one halogen atom other than fluorine with mercuric fluoride.

With fluorinating agents such as antimony trifluoride it is not feasible to replace a halogen atom other than fluorine on an acyclic carbon atom having only one halogen attached thereto (for example, the halogenated carbon atom in ethyl chloride or ethyl bromide). In addition, antimony trifluoride does not cause replacement of halogen other than fluorine to as high a degree as is desired in some compounds (for example, tetra-brom-ethane).

This invention had for an object the provision of a new fluorinating process. Another object was to produce organic fluorine compounds by reactions involving metallic fluorides having a more vigorous (preferential) action than the common metallic fluoride fluorinating agents. Still another object was the substitution of fluorine for halogens whose atomic weight is greater than 19, i. e., halogens other than fluorine in carbon compounds, especially hydrocarbons not readily fluorinated with the common fluorinating agents. A general advance in the art and other objects which will appear hereinafter are also contemplated.

It has now been found that mercuric fluoride is a fluorinating agent which overcomes the aforementioned difficulties.

According to this invention a halogen (other than fluorine) containing compound is reacted in liquid phase with mercuric fluoride. As a result the halogen (other than fluorine) is replaced by fluorine.

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

Example I

The preparation of fluoroform (CHF$_3$) from di-fluoro-mono-bromo-methane was carried out under pressure. The fluorinating agent (1.8 parts of HgF$_2$) was placed in a steel bomb equipped with a steel reflux column having a pressure gauge, a thermometer well and a needle valve (for discharge of the reaction products) at the top. The bomb was cooled with a dry carbon-dioxide-snow acetone mixture, and di-fluoro-bromo-methane (1 part), previously cooled to the temperature of the same mixture, added. The system was then made gas tight, and the contents of the bomb allowed to come to room temperature. The pressure was maintained at about 12 atmospheres (176.4 pounds per square inch gauge) by controlling the heating and by venting the fluoroform formed. The vented gas was collected in liquid air. A yield of 80% based on the starting material was obtained. In an alternative procedure the reflux column was held at −20° to −25° C. and the vented gas collected first in a "carbon ice" acetone bath at about −70° C. This condensed the unchanged di-fluoro-bromo-methane and allowed the fluoroform to pass on to a liquid air condenser (a gasometer has also been used for this purpose).

Since this reaction proceeds in a step-by-step replacement, bromoform (in the presence of a solvent to moderate the reaction), as well as the mono-fluoride derived therefrom may be used as the starting material. Iodoform and its fluorinated derivatives may also be used.

Example II

The preparation of ethyl fluoride from ethyl bromide was carried out under reflux at atmospheric pressures. The ethyl bromide (1 part) was placed in a copper reaction vessel equipped with a copper reflux condenser maintained at about 0° C. Thereafter the mercuric fluoride (2.1 parts) was fed slowly into the reaction vessel which was kept in an ice bath during the addition of the anhydrous salt. The gas generated passed through the reflux condenser and was collected by condensation in a container surrounded by a cooling bath. The condensation was made at about −70° C. The reaction was allowed to continue until there was no more ethyl bromide available. The reaction was apparently quantitative, and the salt remaining in the reaction vessel was mercuric bromide.

Similar results were obtained with ethyl iodide and ethyl chloride. In some cases an inert solvent (such as methylene chloride, benzene and the like) was used to moderate the speed of the reaction.

In a related manner acetyl chloride was converted to acetyl fluoride.

Antimony trifluoride, well known as a fluorinating agent, in some instances causes disintegration of aliphatic compounds, especially those rich in hydrogen atoms. This action, which is accompanied by the splitting out of hydro-halides and the formation of ethylenic compounds, frequently results in complete destruction of the molecule of the starting compound. The action of mercuric fluoride is much less vigorous, as illustrated by the action of mercuric fluoride on ethyl alcohol whereby ethyl fluoride is obtained, and it may therefore be described as a preferential fluorinating agent.

Example III

In a manner analogous to that described in Example II, propyl fluoride was prepared from propyl iodide and from propyl chloride.

Example IV

In a manner analogous to that described in Example II, butyl fluoride was prepared from butyl iodide and butyl bromide.

Example V

In a manner analogous to that described in Example II, amyl fluoride was prepared from amyl iodide. Amyl bromide and amyl chloride behave similarly.

Example VI

The preparation of cyclo-hexyl-fluoride from cyclo-hexyl-bromide (and mercuric fluoride) was carried out in a solvent in the apparatus described in Example II. The formation of considerable quantities of cyclo-hexylene and hydrogen fluoride while the fluorination was still going on showed the instability of this compound.

Example VII

In a cooled copper flask equipped with a cooled reflux condenser (preferably copper) ethylidene bromide ($CH_3CHBr_2$) was converted to ethylidene fluoride. One part of the starting halide was placed in the apparatus and 1.26 parts of mercuric fluoride fed in slowly. The temperature of the reflux condenser was regulated so that the ethylidene fluoride distilled out while the unchanged ethylidene bromide and the ethylidene fluoro-bromide were returned to the reaction vessel for further treatment. A yield of about 90%–95% of ethylidene fluoride was obtained in a receiver cooled with solid carbon dioxide.

In a similar manner the compounds having the formulae $CH_2FCH_2Br$ and $CH_2FCH_2F$ were obtained from the compound having the formula $CH_2BrCH_2Br$. The compound of the formula $CH_2ICH_2I$ behaves similarly. The compound of the formula $CH_2FCH_2F$ was prepared from $CH_2ICH_2Br$. Some butyl fluoride was detected and appreciable quantities of butadiene and butylene were obtained under these reaction conditions.

Ortho- and para-di-bromo-cyclo-hexane gave the corresponding fluor compounds which were relatively unstable. Similar results were obtained with di-chloro-dioxane. In the case of these cyclo-aliphatic compounds hydrogen fluoride and the corresponding ethylenic hydrocarbons were obtained in the final product. Similar results were also obtained in the case of beta-beta'-di-chloro-di-ethyl ether.

Example VIII

The preparation of the compounds having the formulae $CH_2ClCHClF$ and $CH_2ClCHF_2$ from the raw material of the formula $CH_2ClCHCl_2$ was carried out by heating 1 part of the same with 1.7 parts of the fluorinating agent ($HgF_2$) at 140° C. under pressure for several hours. A yield of approximately 50% of $CH_2ClCHClF$ and 10% of $CH_2ClCHF_2$ was obtained.

With a fluorinating agent comprising 20% $SbF_3Cl_2$ and 80% $SbF_3$ fluorination of this raw material proceeds, but the yields obtained do not approach that obtained by the action of mercuric fluoride.

Example IX

The preparation of the compounds having the formulae $CH_2BrCHClF$ and $CH_2BrCHF_2$ from the source material $CH_2BrCHClBr$ was carried out at about 80° C. in a copper vessel equipped with a metallic dephlegmator at atmospheric pressures. The mercuric fluoride was added slowly to the organic poly-halide in the reaction vessel and the resulting mixture heated. The fluorinated material distilled as soon as it was formed, while the unreacted halide refluxed back into the reaction vessel. The heating was carried out in an oil bath. Temperatures as high as 160° C. (at the end of the operation) have been used to insure good yields.

In a similar manner the compounds of the composition $CH_2BrCHBrF$ and $CH_2BrCHF_2$ have been prepared from the compound $CH_2BrCHBr_2$.

Related results were also obtained with $CH_2ICHBr_2$.

Example X

For the preparation of the substances having the formulae $CHF_2CHF_2$ and $CHF_2CHFBr$, a nickel reaction vessel was used. The reaction vessel was fitted with a steel pipe reflux condenser equipped at the top with a needle valve for venting the gaseous product, a pressure gauge and a thermocouple. Into the nickel pot which was heated electrically, 2.3 parts of $CHBr_2CHF_2$ and 1 part of $HgF_2$ were placed. A constant flow of gas was evolved at 120–150 pounds gauge pressure and 180°–190° C. The product was removed by purging and the released gases led through an aqueous calcium carbonate suspension before being passed through a drying tube into a receiver maintained at −70° C. After about 9 hours a fair yield of $CHF_2CHF_2$ and $CHF_2CHFBr$ was obtained.

This reaction also proceeds step-wise so that the compound of the formula $CHBr_2CHBr_2$ (or its mono-fluorinated product) may be used as a raw material.

The present invention finds its greatest applicability in the treatment of halogenated hydrocarbons, although it may be employed with a wide variety of organic compounds, as will be apparent to those skilled in the art after a consideration of the foregoing specific examples. In order to conserve space, attention is directed to United States Patents Nos. 2,005,705, 2,005,708, 2,005,710 and 2,005,711, wherein is disclosed a wide variety of compounds which may be treated with mercuric fluoride.

Super-atmospheric or sub-atmospheric pressure and temperature conditions, instead of room conditions, may be employed, in accordance with the desires of the person carrying out the process of the invention. The upper limits of temperature and pressure are governed only by the decomposition of the compounds being treated and produced. Conditions producing decomposition lower the efficiency of the process, and would not ordinarily be employed.

In order to obtain a liquid phase reaction it is necessary in some instances to employ a solvent. The various common organic solvent or suspension media including hydrocarbons, for example, methylene chloride, benzene, and the fluorine-containing solvents listed in U. S. P. 1,833,847 whose boiling points are appropriate for the reaction conditions desired, may be satisfactorily employed. For efficient operation the solvents should be inert to the mercuric fluoride.

As shown by the various examples, the reaction vessels and associated equipment may be of various metals, the more common ones being preferred for economic reasons. In some instances it is possible to use glass or glass-lined equipment.

The mercuric fluoride is preferably used in an anhydrous state.

In résumé, the invention has the advantage of producing fluorinated organic compounds, particularly fluorinated hydrocarbons, in higher yields and under more advantageous conditions than the known processes which employ the previously known fluorinating agents. According to this invention many fluorinations (previously carried out under special conditions) may now advantageously proceed at room temperature.

An additional advantage is that side reactions are minimized or absent. In particular, important (and uneconomic) splitting-off of hydracids is avoided. The accompanying formation of ethylenic derivatives and frequent complete destruction of the organic molecule are also absent.

A further advantage of the invention is in the fluorinating of compounds theoretically capable of further halogen replacement by fluorine but practically completely fluorinated (because of the exhausted action of previously known fluorinating agents). Still further advantages are that the fluorinating agent may be obtained readily in a state of high purity and that in the fluorinating agent all of the fluorine is available for fluorination.

As many apparently widely different embodiments of this invention may be made without departing from the spirit and scope thereof, it is to be understood that we do not limit ourselves to the specific embodiments thereof except as defined in the appended claims.

We claim:

1. The process of preparing carbon compounds containing fluorine which comprises reacting mercuric fluoride with a compound containing an acyclic carbon atom having attached thereto a halogen atom other than fluorine to substitute fluorine for other halogen therein.

2. The process of preparing carbon compounds containing fluorine which comprises reacting mercuric fluoride with a compound in liquid phase having an acyclic carbon atom to which is attached a halogen atom other than fluorine to substitute fluorine for other halogen therein.

3. The process which comprises reacting an ethane compound containing halogen other than fluorine with mercuric fluoride to form a fluoro ethane.

4. The process of forming ethyl fluoride which comprises treating ethyl alcohol with mercuric fluoride.

5. The process of preparing carbon compounds containing fluorine which comprises reacting mercuric fluoride with a compound having an acyclic carbon atom to which is attached only one halogen atom, said halogen atom having a greater atomic weight than 19, to substitute fluorine for other halogen therein.

6. The process of preparing carbon compounds containing fluorine which comprises reacting mercuric fluoride with a compound in liquid phase having an acyclic carbon atom to which is attached a halogen atom other than fluorine to substitute fluorine for other halogen therein, said compound containing an acyclic carbon atom having only one halogen attached thereto and said halogen having an atomic weight greater than 19.

7. The process of producing compounds containing an acyclic carbon atom having attached thereto more than two fluorine atoms which comprises replacing halogen other than fluorine on an acyclic carbon atom in a compound with fluorine by reacting said compound with mercuric fluoride.

8. The process of preparing carbon compounds containing fluorine which comprises reacting mercuric fluoride with a hydrocarbon containing an acyclic carbon atom having attached thereto a halogen atom other than fluorine to substitute fluorine for other halogen therein.

9. The process of preparing carbon compounds containing fluorine which comprises reacting mercuric fluoride with a saturated hydrocarbon containing an acyclic carbon atom having attached thereto a halogen atom other than fluorine to substitute fluorine for other halogen therein.

THOMAS MIDGLEY, JR.
ALBERT L. HENNE.